US009065565B2

(12) United States Patent
Martinelli et al.

(10) Patent No.: US 9,065,565 B2
(45) Date of Patent: Jun. 23, 2015

(54) DWDM FAST LIGHTPATH SETUP USING NETWORK STATUS INFORMATION

(71) Applicant: Cisco Technology, Inc., San Jose, CA (US)

(72) Inventors: Giovanni Martinelli, Monza (IT); Gabriele Galimberti, Bovisio Masciago (IT); Domenico La Fauci, Monza (IT); Stefano Aina, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 195 days.

(21) Appl. No.: 13/763,772

(22) Filed: Feb. 11, 2013

(65) Prior Publication Data

US 2014/0226979 A1    Aug. 14, 2014

(51) Int. Cl.
*H04B 10/00* (2013.01)
*H04B 10/2507* (2013.01)
*H04J 14/02* (2006.01)

(52) U.S. Cl.
CPC .... *H04B 10/2507* (2013.01); *G06F 2212/6022* (2013.01); *H04J 14/0271* (2013.01)

(58) Field of Classification Search
CPC .............................................. G06F 2212/6022
USPC .......................................................... 398/57
See application file for complete search history.

(56) References Cited

U.S. PATENT DOCUMENTS

| 8,184,971 | B2 | 5/2012 | Vasseur et al. |
| 2002/0191247 | A1 | 12/2002 | Lu et al. |
| 2003/0142293 | A1 | 7/2003 | Wight et al. |
| 2003/0161632 | A1 | 8/2003 | Wang |
| 2004/0175187 | A1 | 9/2004 | Eiselt et al. |
| 2004/0190900 | A1 | 9/2004 | Yagyu |
| 2004/0197103 | A1 | 10/2004 | Roberts et al. |
| 2008/0080473 | A1 | 4/2008 | Thubert et al. |
| 2008/0095058 | A1 | 4/2008 | Dalmases et al. |
| 2009/0269065 | A1 | 10/2009 | Bardalai et al. |
| 2010/0272434 | A1 | 10/2010 | Pastorelli et al. |
| 2010/0272435 | A1* | 10/2010 | Pastorelli et al. ............... 398/25 |
| 2012/0148234 | A1 | 6/2012 | Bellagamba et al. |
| 2013/0010612 | A1 | 1/2013 | Lee et al. |

OTHER PUBLICATIONS

Azodolmolky et al., "Experimental Demonstration of an Impairment Aware Network Planning and Operation Tool for Transparent/Translucent Optical Networks", Journal of Lightwave Technology, IEEE Service Center, New York, NY, vol. 29, No. 4, Feb. 1, 2011, pp. 439-448.
International Search Report and Written Opinion in counterpart International Application No. PCT/US2014/015201, mailed Jul. 18, 2014, 11 pages.
Chava, et al., "Impairment and Regenerator Aware Lightpath Setup Using Distributed Reachability Graphs," High-Speed Networks 2011 (HSN 2011) Workshop at IEEE INFOCOM, 2011, pp. 162-167.
Sambo, et al., "Introducing Crosstalk-Awareness into GMPLS-controlled transparent optical networks," in Optical Fiber Communication Conference and Exposition and The National Fiber Optic Engineers Conference, 2008, pp. 1-3.

* cited by examiner

*Primary Examiner* — Danny Leung
(74) *Attorney, Agent, or Firm* — Edell, Shapiro & Finnan LLC

(57) ABSTRACT

Techniques are presented herein to setup a wavelength on a path from a source node to a destination node. Cross-talk margin information already computed for one or more installed wavelengths is obtained between the source node and destination node. A total margin as a function of the cross-talk margin information is computed. A determination is then made as to whether to perform non-linear impairment validation of the wavelength based on the total margin. These techniques may be generalized to account for coherent and non-coherent portions of a network.

24 Claims, 7 Drawing Sheets

DWDM FAST LIGHTPATH SETUP USING NETWORK STATUS INFORMATION

TECHNICAL FIELD

The present disclosure relates to optical networks.

BACKGROUND

Current Generalized Multi-Protocol Label Switching (GMPLS) Wavelength Switched Optical Networks (WSONs) are able to setup a lightpath for Dense Wavelength Division Multiplexed (DWDM) communications. However, to ensure that a wavelength is feasible for a lightpath, the control plane implements a detailed calculation of Linear and Non-Linear Optical Impairments (NLI). A lightpath NLI validation procedure uses a detailed constraint check to ensure the success of the wavelength setup, but it is also slow because it requires substantial embedded processing power and in some cases serialization of lightpath setup requests.

DESCRIPTION OF EXAMPLE EMBODIMENTS

Overview

Techniques are presented herein to setup a wavelength on a path from a source node to a destination node. Cross-talk margin information already computed for one or more installed wavelengths is obtained between the source node and destination node. A total margin as a function of the cross-talk margin information is computed. A determination is then made as to whether to perform non-linear impairment validation of the wavelength based on the total margin. These techniques may be generalized to account for coherent and non-coherent portions of a network.

Example Embodiments

Presented herein are techniques to identify situations in which wavelength setup can be performed with a limited amount of computing and still have a high probability of success. A goal is to avoid performing non-linear impairment (NLI) validation computations during Dense Wavelength-Division Multiplexed (DWDM) lightpath setup because NLI validation computations have a relatively heavy computational overhead (can take several minutes) and can therefore compromise other critical network operations, such as link restoration.

The impairment margin of a given channel measures the amount of additional impairment of a given type that the channel can tolerate, while still meeting its specified performance. Impairment margins may comprise, for example, cross-talk margins (including four-wave mixing (FWM) and cross-connect module (XCM)), Optical Signal-to-Noise Ratio (OSNR) margins, Polarization Mode Dispersion (PMD) margins and/or filtering margins, etc. As used herein, a "channel" is a lightpath at a particular wavelength.

To this end, a mechanism is provided to partition a DWDM network. The path setup function will have criteria to apply different impairment validation methods depending on where the path resides in the DWDM network partitions. In one form, lightpath setup is based on a value derived from existing optical channel cross-talk margin and in another form, lightpath setup is based on a more sophisticated Traffic Engineering Database (TED) partitioning.

In a DWDM network with a Generalized Multi-Protocol Label Switching (GMPLS) control plane, lightpath setup typically involves two main steps. First, a (constrained) path computation is made from the input lightpath setup request (e.g., a lightpath from node A to node Z) provided the actual hop-by-hop path (e.g., A to B to X to Y to Z). Second, hop-by-hop setup of all connections is made to turn on the lightpath, through a signaling protocol such as the Resource Reservation Protocol (RSVP-TE) used for GMPLS.

Figure 1:
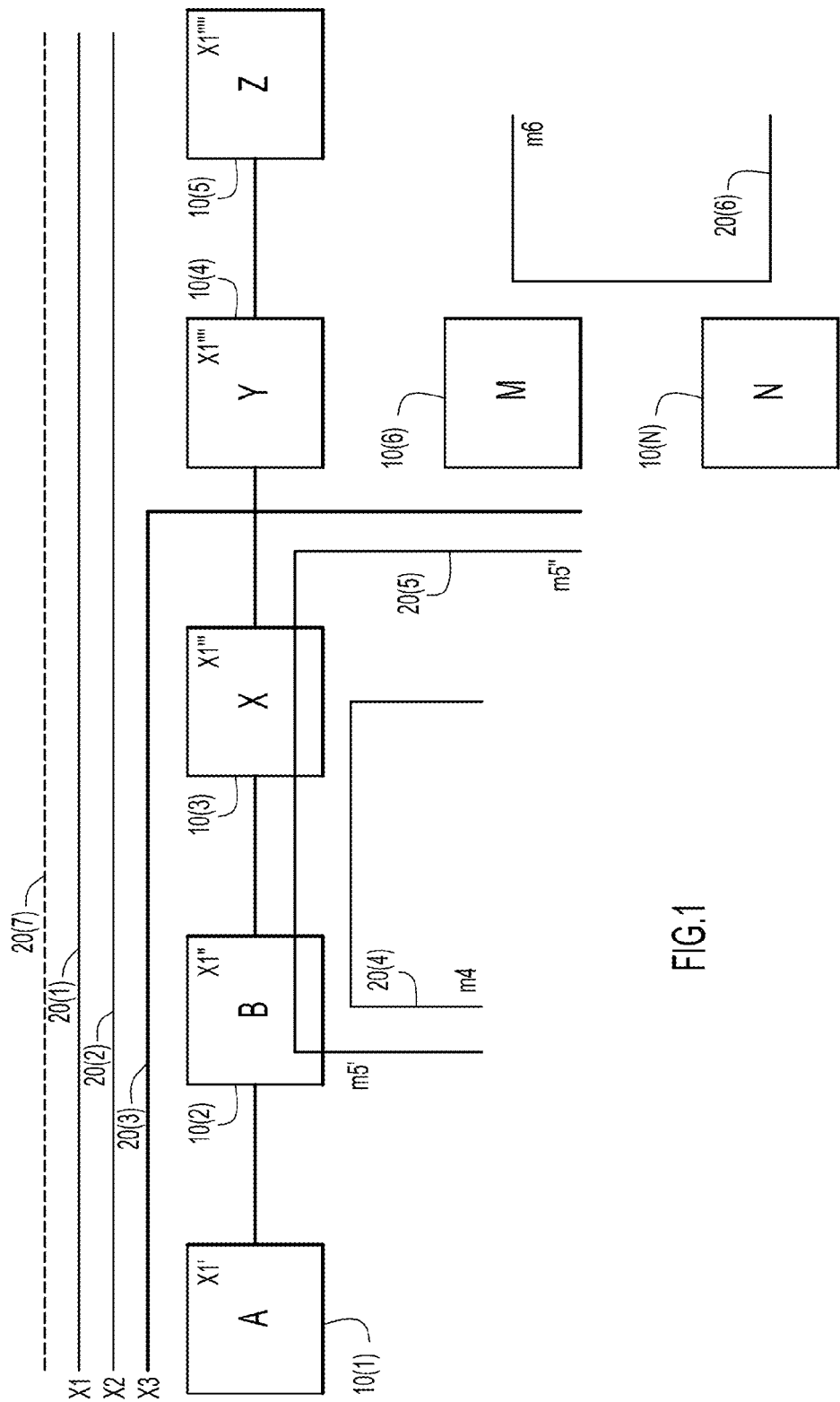
FIG. 1 is diagram of an example optical network in which a lightpath is to be setup for a new wavelength using cross-talk margin information obtained for wavelengths already installed along the lightpath.

Reference is now made to FIG. 1, for a description of a lightpath setup technique involving use of local channel margin information. FIG. 1 shows a portion of an optical network 5 comprising a plurality of nodes 10(1)-10(N) corresponding to nodes labeled A, B, X, Y, Z, M, and N, respectively. In this example, there are already installed wavelengths shown at reference numerals 20(1), 20(2), 20(3), 20(4), 20(5) and 20(6) and a new wavelength to be setup shown in dotted line at reference numeral 20(7). It should be understood that an actual deployment of an optical network may have many more optical nodes and wavelengths. FIG. 1 is therefore a simplified representation of an optical network for purposes of the description herein.

A calculation is made based on localized cross-talk margin information, without the use of information derived from any routing flooding. The computation is made "on-the-fly" in the sense that it uses localized cross-talk margin information already computed for installed wavelengths in the network. One technique to compute cross-talk margin is disclosed in co-pending commonly assigned U.S. Patent Publication No. 20100272434, entitled "Channel Validation in Optical Networks Using Multi-Channel Impairment Evaluation," the entirety of which is incorporated herein by reference. These cross-talk margins are stored in each node of the network. The cross-talk margin(s) are collected and reported to the head node of each lightpath already installed in the network. Each network node comprises a local database, which holds up-to-date impairment margin values of the different channels that traverse the node. A given node may hold multiple types of impairment margins. When two channels traverse a common network node, the effect of one channel on the other can be represented as a decrease in the other channel's impairment margins, which are stored locally at the node. Using this mechanism, the network nodes validate a lightpath by evaluating the expected performance of the channel, as well as its effect on other channels, using the impairment margins stored in the network nodes along the path.

A periodic refresh mechanism is available by a signaling protocol currently deployed in optical networks to maintain the channel status up-to-date at optical nodes in a network. Each node, once it receives a lightpath request, evaluates the current status of cross-talk margins on its channels. Again, the cross-talk margin is/can available from the existing NLI computations.

In the example of FIG. 1, X1 is the minimum cross-talk margin that wavelength 20(1) has along its path, i.e., min(X1', X1", . . . , X1''''), where min( ) is the minimum operation. The margins (X1', . . . , X1'''') are already available at each node as explained above. X2 and X3 are the minimum margins computed for wavelengths 20(2) and 20(3), respectively, calculated in the same way as for margin X1 for wavelength 20(1). m4 is the minimum margin among margins of wavelength 20(4) on node hops shared with wavelengths 20(1) and 20(2). m5' is the minimum margin among margins for wavelength 20(5) on node hops shared with wavelengths 20(1) and 20(2), and m5" is the minimum margin for wavelength 20(5) on hops shared with wavelength 20(3). m6 is the minimum margin for wavelength 20(6) on node hops shared with wavelength 20(5).

From this information, node A can build an Optical Margin Database:

Wavelength 20(1): X1, m4, m5'
Wavelength 20(2): X2, m4, m5'
Wavelength 20(3): X3, m5", m6

For the new wavelength 20(7) to be setup on the path from nodes A-Z, a total margin is computed as a function of the cross-talk margins available at node A, i.e., M=f(X1, X2, m4, m5'). In one example, the function f( ) is a minimum function. The total margin M so computed is then compared with a threshold T, and if M>T, then NLI validation of wavelength 20(7) on the path from nodes A-Z is not needed. The threshold T is a user-defined parameter and is homogeneous with the channel margin (measured in dB). The threshold T may be determined as part of a network design phase or by network engineer heuristics. As a parameter it can also be user provisioned or adjustable. An example value for the threshold T is 3 dB.

Figure 2:
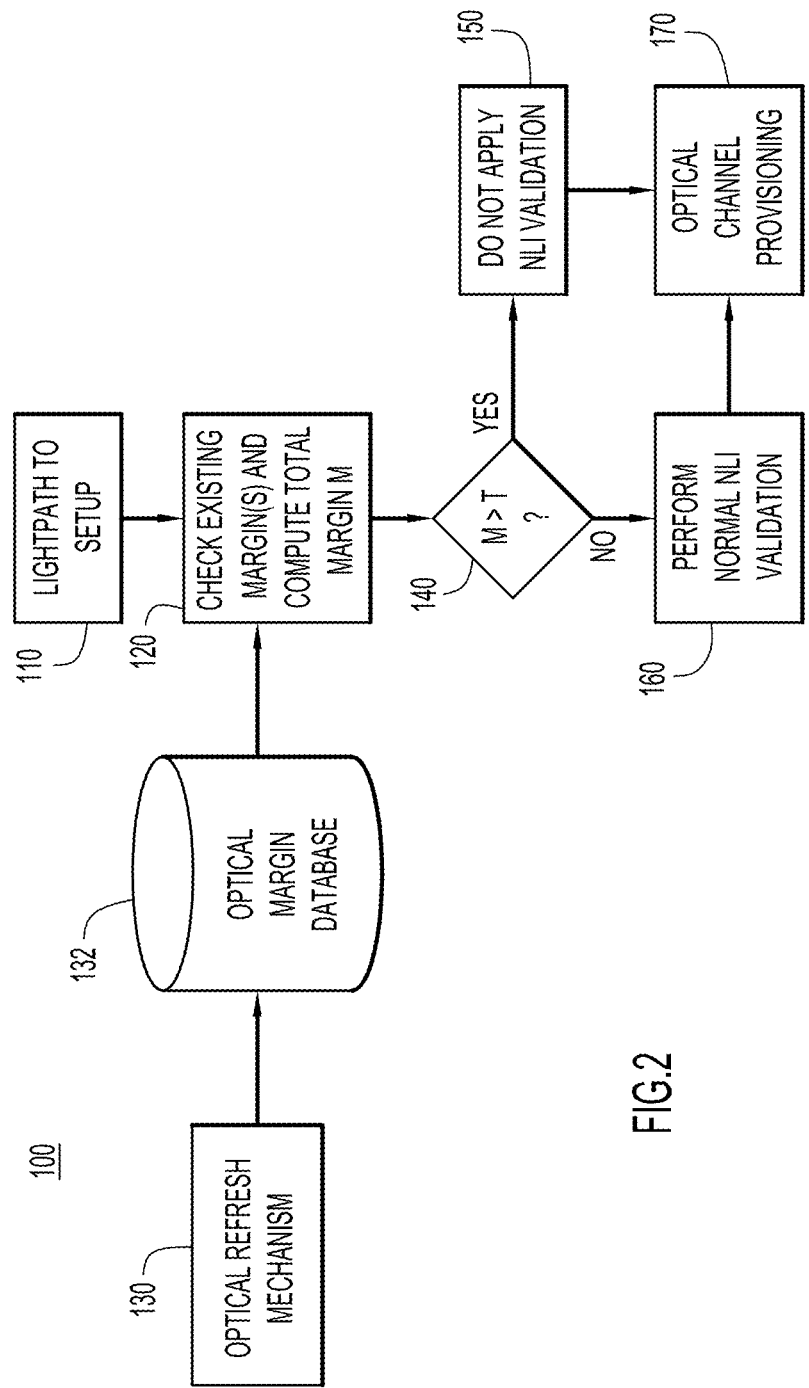
FIG. 2 is a flow chart depicting operations performed to determine whether to perform full non-linear impairment validation when setting up a new lightpath.

Reference is now made to FIG. 2 for a description of a flow chart for a process 100 according to the technique depicted in FIG. 1. At 110, a request is received/generated for a lightpath to be setup between any two nodes, e.g., nodes A and Z, for a particular wavelength. When a lightpath is to be setup, each node in along the lightpath receives a lightpath request, and at 120 each node evaluates the current status of cross-talk margins for the wavelengths (m) already installed. As shown at 130, the NLI residual margin optical refresh operation is performed to collect/obtain wavelength dependent cross-talk margins based on the minimum between all residual margins of the installed adjacent wavelengths that the wavelength to be setup crosses along its path. The optical refresh operation 130 is independent and asynchronous from the lightpath request 110. In other words, wavelength dependent cross-talk margin information is obtained based on the minimum among cross-talk margins of installed adjacent wavelengths that traverse the path of the wavelength to be setup. Any source node is able to create a database for each installed wavelength with two values available: wavelength (channel) m and cross-talk margin x for that wavelength channel. The cross-talk margin information is obtained at the source node for the lightpath to be setup from the one or more nodes along the lightpath. This information can be generalized to a wavelength range so that a node can create a spectrum partitioning based on cross-talk margins (low margin/high margin wavelengths). In other words, the optical margin database at each node may store optical cross-talk margin information partitioned by spectrum/wavelength range and based on relative values of cross-talk margins. The optical margin database stored at each node is depicted at 132 in FIG. 2.

Upon a new lightpath request, the control plane determines a new path between the source node and the destination node (e.g., A and Z) to be setup for a wavelength. There likely are some wavelengths already setup (installed) from the source node to the destination node. For the new lightpath, at 120, using the data stored in the optical margin database 132, each node computes the Total Margin M as a function of the wavelength dependent cross-talk margins retrieved from the optical margin database 132 at the source node for adjacent wavelengths that the wavelength to be setup crosses along its path between the source node and destination node, e.g., M=f(m, x).

At 140, the Total Margin M is compared to a threshold T. If the Total Margin M is greater than the threshold T, the node will continue with the wavelength setup with no NLI validation as shown at 160. On the other hand, if the total margin M is less than (or equal to) the threshold T, then the wavelength setup continues subject to a full/normal NLI validation. Optical channel provisioning is performed at 170, either without full/normal NLI validation at 150 or with full/normal NLI validation at 160.

The method depicted in FIGS. 1 and 2 does not change existing path computation techniques or the path setup phase. This method collects and makes use of existing information to enable/disable a NLI validation operation for a lightpath to be setup. The m and x values are maintained up-to-date by path refresh mechanisms which already exist in optical networks. As explained above, the path refresh mechanisms can be triggered either by a request to provision a new lightpath or on a periodic basis independent from a lightpath request.

Figure 3:
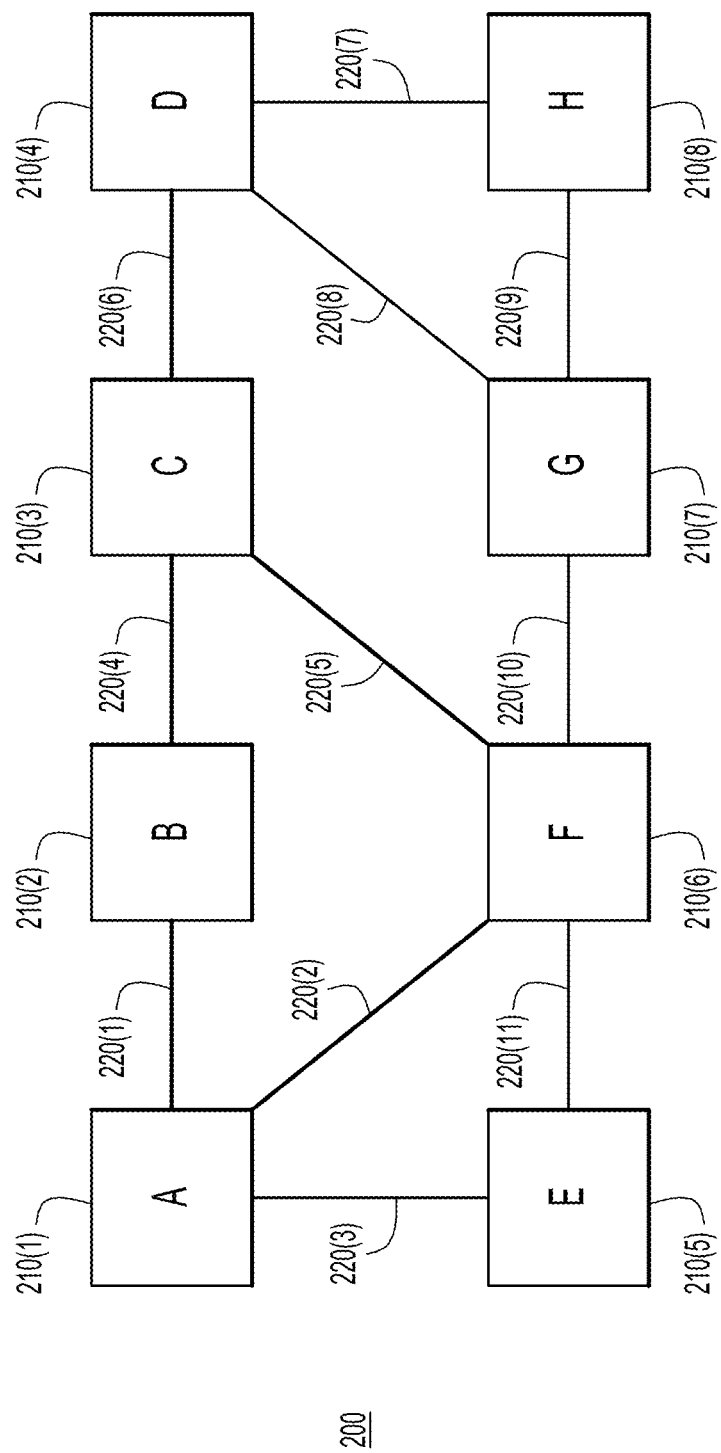
FIG. 3 is a diagram of an example optical network in which information about coherent and non-coherent links is used to further determine whether to perform full non-linear impairment validation when setting up a new lightpath.

Reference is now made to FIGS. 3-6 for a description of a lightpath setup method that uses Traffic Engineering Database (TED) partitioning. FIG. 3 shows an optical network 200 comprising nodes 210(1)-210(8), labeled A-H, respectively. There are links between nodes such that link 220(1) connects node A to node B, link 220(2) connects node A to node F and link 220(3) connects node A to node E. Link 220(4) connects node B to node C. Link 220(5) connects node C to node F. Link 220(6) connects node C to node D. Link 220(7) connects node D to node H and link 220(8) connects node D to node G. Link 220(9) connects nodes G and H. Link 220(10) connects nodes F and G, and link 220(11) connects nodes E and F. In this example, links 220(3), 220(7)-220(11) are coherent links meaning that they carry wavelengths solely with coherent light. The remaining links 220(1), 220(2), 220(4)-220(6) are non-coherent links, meaning they carry at least one wavelength for light that is non-coherent.

Figure 4:
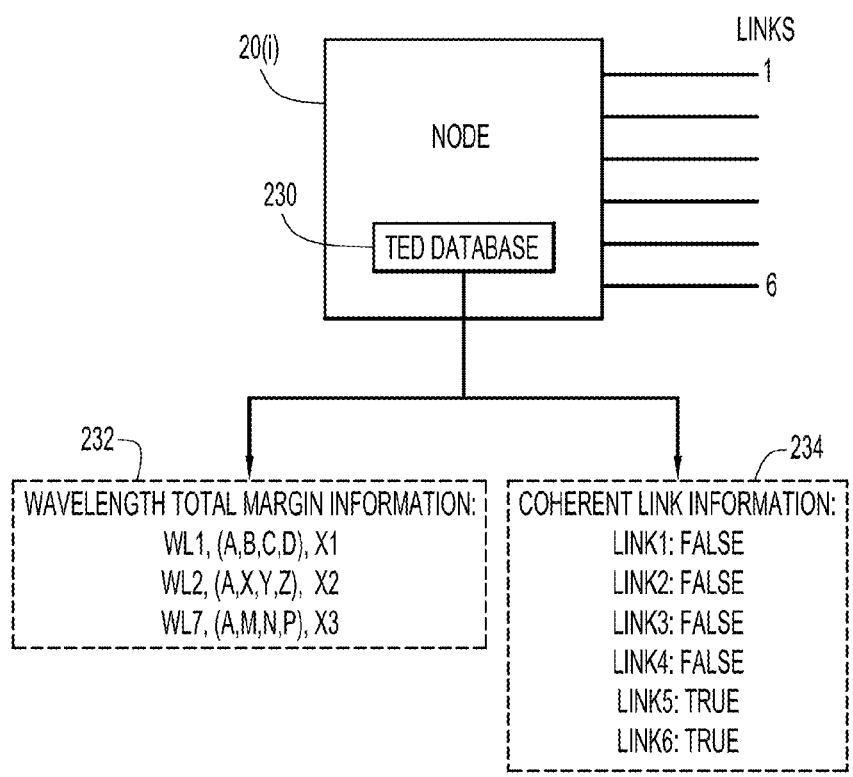
FIG. 4 illustrates an example of information stored at an optical node for already installed wavelengths and for use in determining whether to perform full non-linear impairment validation when setting up a new lightpath.

Reference is now made to FIG. 4. FIG. 4 shows one of the nodes of FIG. 3, generically identified by reference numeral 210($i$). Node 210($i$) stores in a memory data for a TED 230. The TED 230 contains, for each destination node in the network, information used to perform a proper constrained-shortest path first (SPF) procedure. The following information can be included in the TED at each node:

1. Wavelength Total Margin information (represented by an integer, for example) shown at 232. This information is available locally as explained above in connection with FIGS. 1 and 2. Furthermore, the Total Margin information 232 can be made available via the Interior Gateway Protocol (IGP) or by other means so that every node is aware of available margins in the entire optical network. (In case of margin fluctuations proper hysteresis is applied to limit variations).

2. Coherent Link information (represented by a Boolean/Logic value) 234. This information is available by provisioning or obtained by link usage. The Coherent Link information 234 indicates whether or not a link is fully coherent (carries only coherent light), and this information is inserted in the local-link database and spread via IGP. If a link is fully coherent, a flag is set to True for that link. If a link carries only non-coherent light or both coherent and non-coherent light, the flag is set to False.

For example, as shown in FIG. 4, there are six links, Links 1-6, for node 210(*i*). The Wavelength Total Margin information 232 available at this node is X1 for wavelength WL1, on a SPF path through nodes A, B, C and D; X2 for wavelength WL2 on a SPF path through nodes A, X, Y, and Z; and X3 on a SPF path through nodes A, M, N and P. The Coherent Link information 234 includes flag values for Links 1-6, such that the flag is False for Links 1-4, and True for Links for Links 5 and 6 because Links 5 and 6 serve only coherent lightpaths, whereas Links 1-4 serve non-coherent lightpaths.

Figure 5:
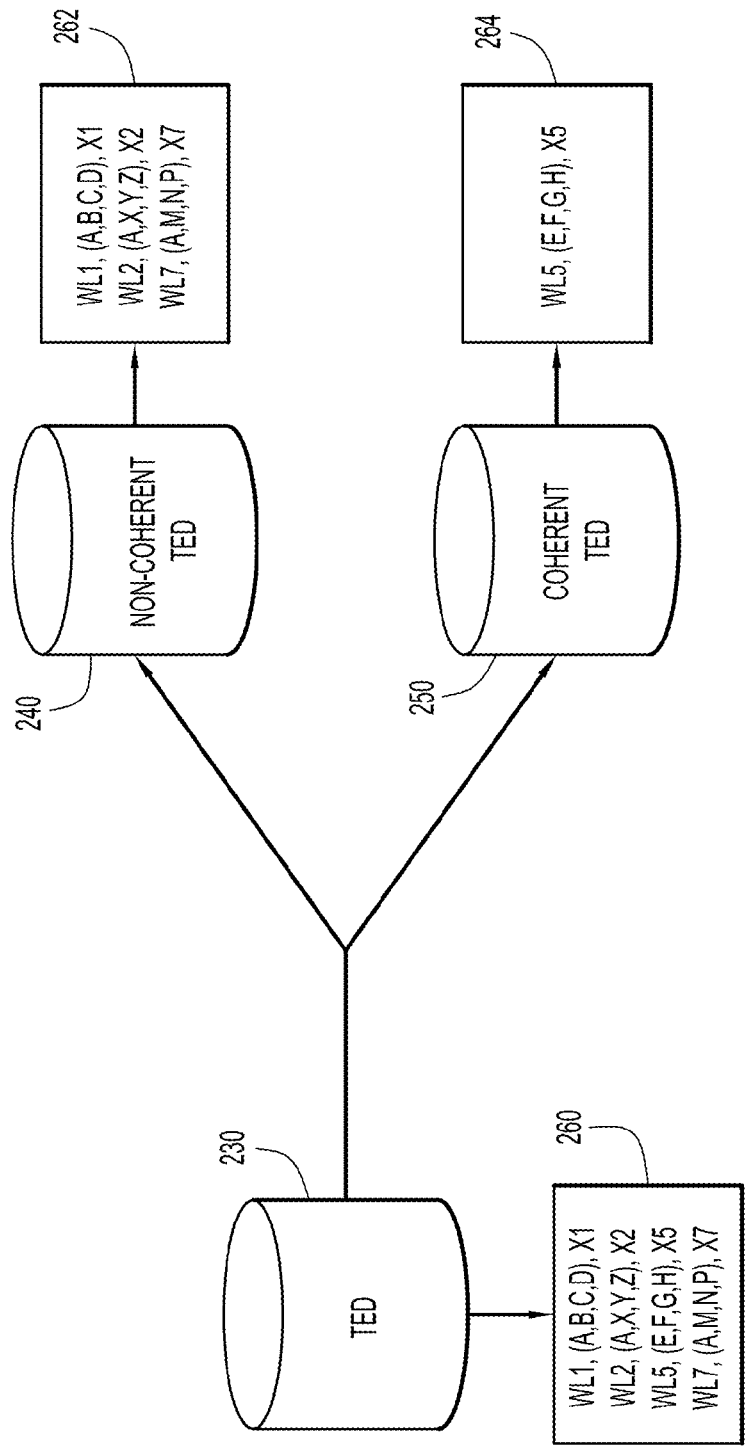
FIG. 5 is a diagram illustrating the partitioning of a traffic engineering database into coherent and non-coherent portions for cross-talk margin information on optical links.

Reference is now made to FIG. 5. The Wavelength Total Margin information 232 and Coherent Link information 234 in TED 230 results in a "virtual" TED partitioning between a Non-Coherent TED portion 240 and a Coherent TED portion 250. Information stored in the Non-Coherent TED portion 240 is further designated as either a "High" margin network portion (optical link) or a "Low" margin network portion (optical link). The aforementioned margin threshold T (FIG. 2) may be used to delineate network portions with relatively high margin values from network portions with relatively low margin values. Network portions that have a Total Margin that exceeds the threshold T are labeled/designated as "High" margin network portions and network portions that have a Total Margin that is less than the threshold T are labeled/designated as "Low" margin network portions. Thus, network portions may be categorized as one of the following:

1. "C" for coherent network portion for network portions that involve only coherent lightpaths.
2. "NC-HighMargin" for network portions that have non-coherent lightpaths and have a relatively high Total Margin.
3. "NC-LowMargin" for network portions that have non-coherent lightpaths and have a relatively low Total Margin.

The above information is included in routing advertisements among nodes so that each node updates its TED with information from nodes in all portions of a network. As a result, for a new lightpath to be setup from a source node to a destination node, the source node may store an indication of which links/network portions are coherent, and the cross-talk margin information for coherent links and cross-talk margin information for non-coherent links, in separate database portions. The source node may also store an indication of the non-coherent links whose total margin exceeds the threshold T.

FIG. 5 shows an example in which information 260 stored in TED 230 includes Total Margin information for wavelengths WL1, WL2, WL5 and WL7, and information indicating the lightpath for wavelength WL5 travels on fully coherent links and the lightpaths for wavelengths WL1, WL2 and WL7 travel on non-coherent links. As a result, the Total Margin information for wavelengths WL1, WL2 and W7 shown at 262 is stored in Non-Coherent TED 240 and the Total Margin information for wavelength WL5 is stored in Coherent TED 250. For a new lightpath request, the control plane will run an SPF determination, and according to the results will be able to assess if the new lightpath will stay in only one network portion (coherent only) or will cross different portions (coherent and non-coherent).

Figure 6:
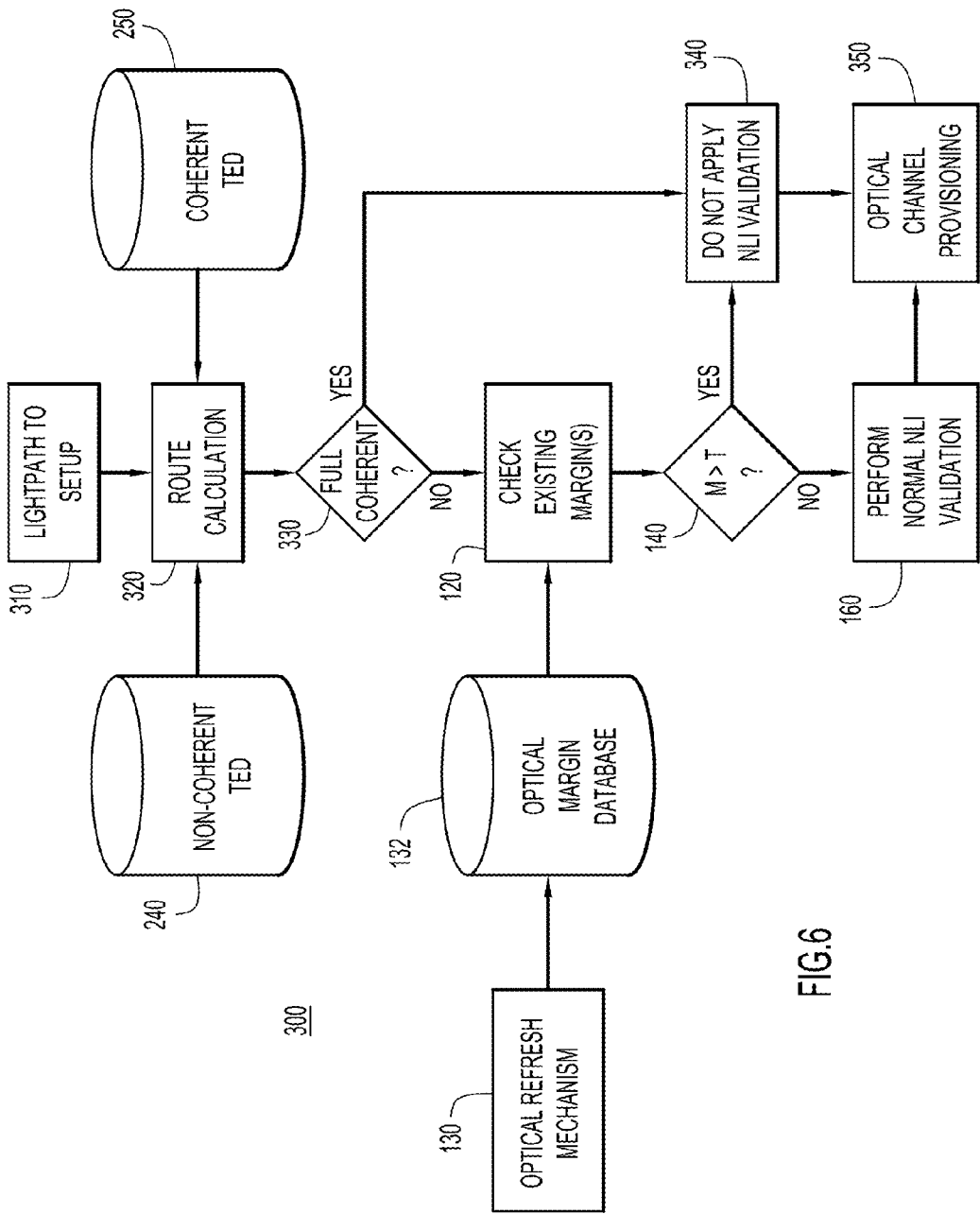
FIG. 6 is a flow chart depicting operations performed to use information indicating whether the lightpath to be setup traverses coherent optical links or non-coherent optical links to determine whether to perform full non-linear impairment validation.

Reference is now made to FIG. 6 for a description of a flowchart for a process 300 that exploits the information pertaining to coherent/non-coherent network portions. The process 300 uses the Non-Coherent TED 240 and Coherent TED 250, as well as the optical refresh mechanism 130 and optical margin database 132 described above in connection with FIG. 2. At 310, a lightpath request is received at a source node to setup a lightpath to a destination node, e.g., for a lightpath A-Z. At 320, a route calculation is performed, e.g., a SPF route calculation. The route calculation is made based on information stored in both the Non-Coherent TED portion 240 and Coherent TED portion 250. The same reference numerals are used in FIG. 6 for operations that are similar to those depicted in FIG. 2.

At 330, using the route calculation results, a determination is made as to whether the route for the path for the new wavelength will travel only on links which are fully coherent. If it is determined that the route calculated for the lightpath traverses only fully coherent links, then at 340 the path will be setup without a full NLI validation. Each coherent Link has an NLI contribution, and the Total Optical Channel NLI is the summation of the NLI contribution for each coherent link. At 350, lightpath setup is completed with provisioning of the optical. Thus, when it is determined that the path to be setup for the new wavelength is to traverse only coherent optical links, a total NLI is computed based on a sum of NLI information for each coherent optical link and the wavelength is provisioned on the path without performing full NLI validation.

On the other hand, if the lightpath traverses one or more non-coherent links, then the process continues to operation 120. At 120, the node evaluates the current status of cross-talk margins for the wavelengths (m) already installed. At this point, the lightpath has already been determined to travel across non-coherent links, and furthermore the Total Margin has been determined, from information contained in Non-Coherent TED 240, to be either a "High" margin (Total Margin M>T) or Low margin (Total Margin<T) based on the further partitioning of Non-Coherent TED 240. Thus, at 140, a determination is made of whether the Total Margin is greater than the threshold T. If the lightpath has a Total Margin that is greater than the threshold T (i.e., it is a NC-HighMargin lightpath), then the method proceeds to operation 340 where NLI validation is not performed and thereafter at 350 the wavelength is provisioned. Thus, when the Total Margin M for the one or more non-coherent links exceeds the threshold T, then the wavelength can be setup on the path without performing full NLI validation, e.g., the simple validation is based on the Total Margin. Conversely, if at 140 it is determined that the lightpath traverses any NC-LowMargin link, the full NLI validation process is applied at 160, and thereafter the optical network is provisioned at 350.

The method shown in FIG. 6 is suitable to be abstracted to a user level by obtaining as an input path request that specifies "Coherent Only" for a user requesting to setup a lightpath that traverses only coherent portions of an optical network. For example, a request to setup a path for a wavelength may include information specifying that the path traverse only coherent links. In that case, the total NLI is computed based on a sum of NLI information for each coherent link and the wavelength is provisioned on the path without performing NLI validation.

Figure 7:
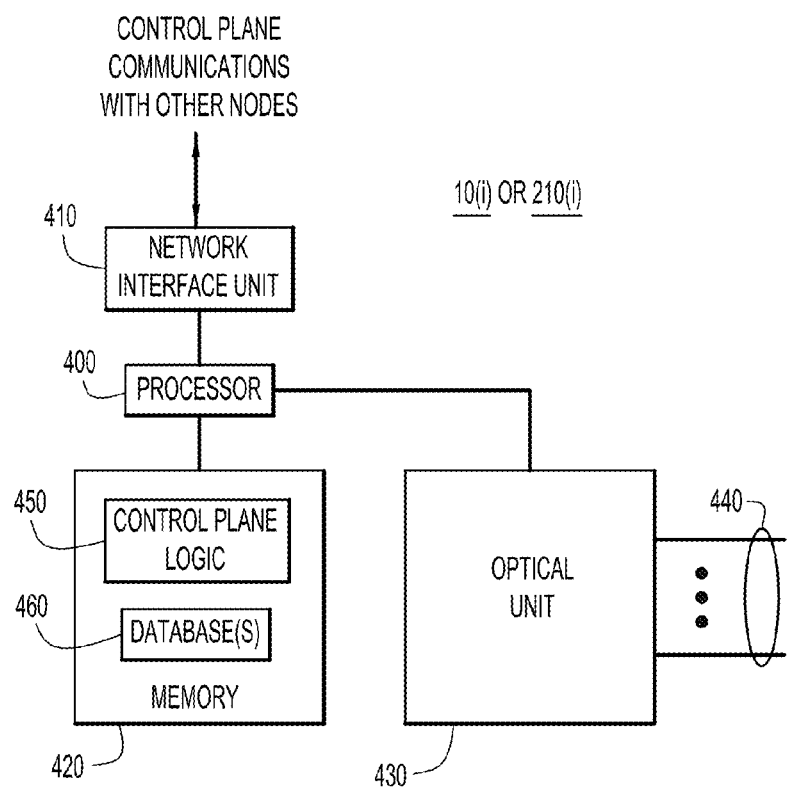
FIG. 7 is an example block diagram of an optical node configured to perform the lightpath setup techniques presented herein.

Turning to FIG. 7, an example block diagram is shown of an optical node configured to perform the techniques presented herein. This block diagram is a general representation of any of the optical nodes shown in FIG. 1 and FIGS. 3 and 4, and thus is identified by reference numeral 10(i) or 210(i) in FIG. 7. The block diagram of FIG. 7 is not meant to be exhaustive. The optical node includes a processor 400, network interface unit 410, memory 420, and an optical unit 430. The optical unit 430 generates optical signals for transmission on one or more fibers 440 and receives optical signals on the one or more fibers 440 (at two ends of a channel), as well as switches optical signals (for intermediate nodes). The processor 400 may be a microprocessor or microcontroller that is programmable and serves as a controller for the node in executing software instructions stored in memory 420. To this end, the memory 420 stores instructions for control plane logic 450 and also stores one or more databases 460 containing the wavelength dependent cross-talk margin information that is learned by the optical node from other optical nodes, e.g., database 132 in FIG. 2, and the TED 230, with non-coherent TED portion 240 and coherent TED portion 250. The control plane logic 450 includes executable instructions that, when executed by the processor 400, cause the processor 400 to perform the operations described herein in connection with FIG. 2 and FIGS. 4-6.

Memory 420 may comprise read only memory (ROM), random access memory (RAM), magnetic disk storage media devices, optical storage media devices, flash memory devices, electrical, optical, or other physical/tangible memory storage devices. Thus, in general, the memory 420 may comprise one or more tangible (non-transitory) computer readable storage media (e.g., a memory device) encoded with software comprising computer executable instructions and when the software is executed (by the processor 400) it is operable to perform the operations described herein.

In summary, techniques are presented herein to setup a wavelength on a path from a source node to a destination node. Cross-talk margin information already computed for one or more installed wavelengths is obtained between the source node and destination node. A total margin as a function of the cross-talk margin information is computed. A determination is then made as to whether to perform non-linear impairment validation of the wavelength based on the total margin. These techniques may be generalized to account for coherent and non-coherent portions of a network.

This mechanisms provide a way to create a network partition so that a set of protocols, such as the GMPLS protocols, have the proper information to apply a fast impairment validation (when the cross-talk margin information along the path of the wavelength to be setup indicates that it is possible) or a full validation (which is slower) when the cross-talk margin information along the path indicates that it is not possible.

As explained above in connection with FIGS. 1 and 2, a technique is presented that makes use of already existing cross-talk margin information for installed wavelengths. This. local optical channels margin technique does not change existing protocols, and provides additional criteria useful to decide what level of impairment validation to use for setting up a new lightpath. Furthermore, the local optical channels margin technique can be generalized, as explained above in connection with FIGS. 3-6, to employ global TED partitioning based on the above cross-talk margin information in addition to information about portions of the optical network that the lightpath traverses which use coherent light. This coherent/non-coherent information is used with the SPF route information to determine whether to apply full NLI validation for the lightpath to be setup.

The techniques presented herein allow the optical control plane to greatly simplify path validation, resulting in much faster setup of a lightpath. Partitioning of the optical network between coherent/non-coherent portions can be achieved without network administrator intervention. This is very useful during a restoration phase, as well as bundle or wavelength setup since it allows for a faster operation while maintaining a level of confidence that the wavelength setup will succeed.

Thus, a method is provided in which, for a wavelength to be setup on a path from a source node to a destination node, cross-talk margin information already computed for one or more installed wavelengths between the source node and destination node is obtained. A total margin is computed as a function of the cross-talk margin information. It is then determined whether to perform non-linear impairment validation of the wavelength based on the total margin for purposes of setting up the wavelength. These techniques may be embodied in one or more computer readable storage media encoded with software comprising computer executable instructions and when the software is executed, it is operable to perform these operations.

When these techniques are embodied in an apparatus, the apparatus may comprise an optical unit configured to transmit, receive or switch optical signals over an optical network; and a processor coupled to the optical unit. The processor is configured to, for a wavelength to be setup on a path from a source node to a destination node in the optical network, obtain cross-talk margin information already computed for one or more installed wavelengths between the source node and destination node; compute a total margin as a function of the cross-talk margin information; and determine whether to perform non-linear impairment validation of the wavelength based on the total margin for purposes of setting up the wavelength.

The above description is intended by way of example only.

What is claimed is:

1. A method comprising:
receiving at a source node, a request for a wavelength to be setup on a path from the source node to a destination node;
obtaining at the source node, cross-talk margin information already computed for one or more installed wavelengths between the source node and destination node;
computing at the source node, a total margin for an entire path from the source node to the destination node as a function of the cross-talk margin information already computed at each node along the entire path; and
determining at the source node, whether to perform non-linear impairment validation of the wavelength based on the total margin for purposes of setting up the wavelength.

2. The method of claim 1, wherein determining comprises comparing the total margin with a threshold, and if the total margin exceeds the threshold, then provisioning the optical channel for the wavelength on the path without performing non-linear impairment validation.

3. The method of claim 2, further comprising obtaining wavelength dependent cross-talk margins based on a minimum among cross-talk margins of installed adjacent wavelengths that traverse the path of the wavelength to be setup, and computing the total margin comprises computing a minimum of the wavelength dependent cross-talk margins.

4. The method of claim 2, wherein obtaining comprises obtaining the cross-talk margin information from the one or more nodes in the path.

5. The method of claim 4, further comprising storing the cross-talk margin information partitioned by wavelength range and based on relative values of cross-talk margins.

6. The method of claim 1, further comprising storing at the source node cross-talk margin information for coherent links and cross-talk margin information for non-coherent links.

7. The method of claim 6, further comprising storing an indication of non-coherent links whose total margin exceeds a threshold.

8. The method of claim 7, further comprising determining whether the path traverses only coherent links, and when it is determined that the path traverses only coherent links, further comprising computing a total non-linear impairment based on a sum of non-linear impairment information for each coherent link and provisioning the wavelength on the path without performing non-linear impairment validation.

9. The method of claim 8, wherein when it is determined that the path traverses one or more non-coherent links, further comprising determining whether the one or more non-coherent links have a total margin that exceeds the threshold.

10. The method of claim 9, wherein when it is determined that the total margin for the one or more non-coherent links that the path traverses exceed the threshold, further comprising provisioning the wavelength on the path without performing non-linear impairment validation.

11. The method of claim 6, wherein when it is determined that the path traverses one or more non-coherent optical links that do not exceed the threshold, further comprising performing full non-linear impairment validation for the path.

12. The method of claim 11, wherein the request includes information specifying that the path traverse only coherent links, and further comprising computing a total non-linear impairment based on a sum of non-linear impairment information for each coherent link and provisioning the wavelength on the path without performing non-linear impairment validation.

13. One or more non-transitory computer readable storage media encoded with software comprising computer executable instructions and when the software is executed operable to cause a processor to:
receive a request for a wavelength to be setup on a path from a source node to a destination node;
obtain cross-talk margin information already computed for one or more installed wavelengths between the source node and destination node;
compute a total margin for an entire path from the source node to the destination node as a function of the cross-talk margin information already computed at each node along the entire path; and
determine whether to perform non-linear impairment validation of the wavelength based on the total margin for purposes of setting up the wavelength.

14. The computer readable storage media of claim 13, wherein the instructions operable to cause the processor to determine comprise instructions operable to cause the processor to compare the total margin with a threshold, and if the total margin exceeds the threshold, further comprising instructions operable to cause the processor to provision the wavelength on the path without performing non-linear impairment validation.

15. The computer readable storage media of claim 13, further comprising instructions operable to cause the processor to obtain wavelength dependent cross-talk margins based on a minimum among cross-talk margins of installed adjacent wavelengths that traverse the path of the wavelength to be setup, and compute the total margin comprises computing a minimum of the wavelength dependent cross-talk margins.

16. The computer readable storage media of claim 13, further comprising instructions operable to cause the processor to store at the source node cross-talk margin information for coherent links and cross-talk margin information for non-coherent links.

17. The computer readable storage media of claim 16, further comprising instructions operable to cause the processor to determine whether the path traverses only coherent links, and when it is determined that the path traverses only coherent links, further comprising instructions operable to cause the processor to compute a total non-linear impairment based on a sum of non-linear impairment information for each coherent link and to provision the wavelength on the path without performing non-linear impairment validation.

18. The computer readable storage media of claim 17, further comprising instructions operable to cause the processor to determine whether the one or more non-coherent links have a total margin that exceeds the threshold when it is determined that the path traverses one or more non-coherent links, and to provision the wavelength on the path with or without performing non-linear impairment validation depending on whether the one or more non-coherent links have a total margin that exceeds the threshold.

19. An apparatus comprising:
an optical unit configured to transmit, receive or switch optical signals over an optical network; and
a processor coupled to the optical unit, wherein the processor is configured to:
receive a request for a wavelength to be setup on a path from a source node to a destination node in the optical network;
obtain cross-talk margin information already computed for one or more installed wavelengths between the source node and destination node;
compute a total margin for an entire path from the source node to the destination node as a function of the cross-talk margin information already computed at each node along the entire path; and
determine whether to perform non-linear impairment validation of the wavelength based on the total margin for purposes of setting up the wavelength.

20. The apparatus of claim 19, wherein the processor is configured to determine whether to perform non-linear impairment validation by comparing the total margin with a threshold, and if the total margin exceeds the threshold, to provision the wavelength on the path without performing non-linear impairment validation.

21. The apparatus of claim 19, wherein the processor is further configured to store in a memory at the source node cross-talk margin information for coherent links and cross-talk margin information for non-coherent links.

22. The apparatus of claim 19, wherein the processor is further configured to determine whether the path traverses only coherent links, and when it is determined that the path traverses only coherent links, the processor is configured to compute a total non-linear impairment based on a sum of non-linear impairment information for each coherent link and to provision the wavelength on the path without performing non-linear impairment validation.

23. The apparatus of claim 22, wherein the processor is further configured to determine whether the one or more non-coherent links have a total margin that exceeds the threshold when it is determined that the path traverses one or more non-coherent links, and to provision the wavelength on the path with or without performing non-linear impairment validation depending on whether the one or more non-coherent links have a total margin that exceeds the threshold.

24. The apparatus of claim 20, wherein the processor is further configured to obtain wavelength dependent cross-talk margins based on a minimum among cross-talk margins of installed adjacent wavelengths that traverse the path of the wavelength to be setup, and compute the total margin by computing a minimum of the wavelength dependent cross-talk margins.

* * * * *